Oct. 20, 1953  D. E. GOMMEL  2,655,958
SAW CHAIN
Filed Feb. 19, 1951
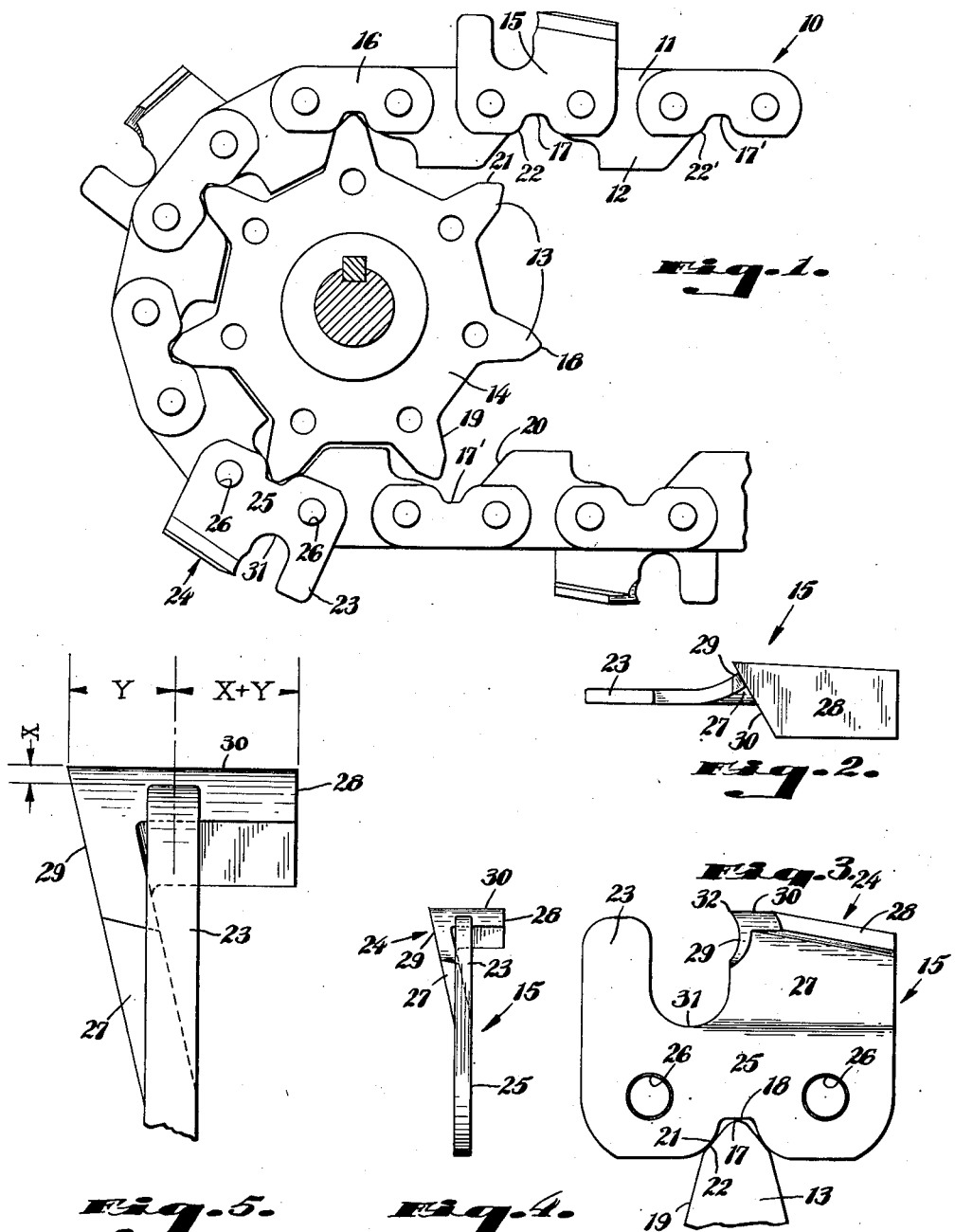
INVENTOR.
DEWEY E. GOMMEL,
BY:
Harold B. Hood.
ATTORNEY.

Patented Oct. 20, 1953

2,655,958

UNITED STATES PATENT OFFICE 2,655,958

SAW CHAIN

Dewey E. Gommel, Indianapolis, Ind., assignor, by mesne assignments, to Borg-Warner Corporation, Chicago, Ill., a corporation of Illinois Application February 19, 1951, Serial No. 211,741

5 Claims. (Cl. 143—135)

1

The present invention relates to a saw chain, and the primary object of the invention is to provide a chain having cutters of improved characteristics, whereby the tendency of previously-known chains to wander from the optimum lateral confines of the kerf to be cut will be substantially, if not completely, overcome. A further object of the invention is to provide a cutter-carrying link for a saw chain so designed that the portions of the cutting edge disposed on opposite sides of the plane of the link body and actually at work during operation of the chain, will be equal in length. To that end, I provide a link having a cutter or tooth projecting from the link body and deflected laterally in one direction from that plane, said tooth including also a portion, projecting laterally in the opposite direction from the outer end of the deflected portion, traversing the plane of the link body, and having an extent, laterally in the opposite direction from said plane, equal to the maximum deflection of the first-mentioned portion increased by the controlled depth of cut of the deflected portion.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a side elevation of a fragment of a chain constructed in accordance with the present invention and shown in cooperative relation with a driving sprocket;

Fig. 2 is an enlarged plan view of a cutter-carrying link constructed in accordance with the present invention;

Fig. 3 is a side elevation of such a link, shown in cooperative relation with a tooth of a driving sprocket;

Fig. 4 is a front elevation thereof; and

Fig. 5 is an enlarged, fragmental front elevation showing the relation between the cutter tooth and a depth gauge formed integral with the link in the preferred embodiment of my invention.

Referring more particularly to the drawings, it will be seen that I have illustrated a fragment of a chain, indicated generally by the reference numeral 10, and comprising center links 11, each of which is provided with a tongue 12 adapted to ride in the groove of a conventional chain saw cutter bar, and to have driving association

2 with the teeth 13 of a driving sprocket 14. Said center links are pivotally connected through cutter-carrying links 15 and intermediate links 16, as shown. Each cutter-carrying link is provided on its inner edge with a notch 17 whose base is adapted to be engaged by the nose 18 of a tooth 13; and each side link 16 is provided with a notch 17' of corresponding contour. Each tooth 13 is formed with a driving surface 19 engageable with the trailing edge 20 of a tongue 12, and with a more sharply inclined surface 21 adapted to have line contact with the curved forward side wall 22 of a notch 17 or the corresponding wall 22' of a notch 17'.

The body 25 of each link 15 comprises a planar plate formed, near its forward and rear ends, with perforations 26, 26 disposed on parallel axes perpendicular to the plane of said body. At the forward end of the body, a depth gauge 23 projects in a direction generally perpendicular to the plane common to the axes of the perforations 26, 26; and a cutter tooth, indicated generally by the reference numeral 24, projects in a generally corresponding direction from said body near the rear end thereof, the depth gauge and the cutter tooth being separated by a gullet 31.

As is more clearly illustrated in Figs. 4 and 5, the tooth 24, in the illustrated embodiment of the invention, comprises a shank 27 deflected laterally from the plane of the body 25, and a toe 28 carried at the outer end of the shank 27 and substantially perpendicular to the plane of the link body 25. Alternate cutter-carrying links 15 in the chain have their tooth shanks 27 deflected in opposite lateral directions. Near its outer end, the shank 27 is beveled rearwardly and toward the plane of the body 25 to define a chisel edge 29; and the leading face of the toe 28 is similarly beveled to define a chisel edge 30. In the illustrated embodiment of the invention, the edges 29 and 30 meet in a sharp angle, to define a point 32, and I presently believe this arrangement to be optimum, but not essential.

The depth gauge 23, of course, will determine the depth to which the tooth 24 will cut as it is drawn through a kerf being formed in the work. The tooth 24 is, of course, formed to provide suitable relief for the edges 29 and 30, in accordance with conventional practice. Thus the upper edge of the toe 28, as viewed in Fig. 2, inclines downwardly and to the right; while the upper surface of the toe, as viewed in Fig. 3, likewise inclines downwardly and to the right. The toe itself is inclined slightly upwardly and to the right as viewed in Fig. 4 so that, when the edge 30 is formed, at the rake angle illustrated in Fig.

2, that edge will lie in a plane substantially perpendicular to the plane of the body 25.

As is most clearly to be seen in Fig. 5, the toe 28 projects laterally, from the outer end of the shank 27, in a direction opposite the direction of deflection of said shank, to intersect the median plane of the body 25 and to extend therebeyond. The degree of such extension of the toe 28 to the right, as viewed in Fig. 5, beyond the median plane of the link body is greater than, rather than equal to, the transverse length of that portion of the toe disposed on the left side of the median plane. Ideally, the lateral extent of that portion of the edge 30 disposed on the right, or inner, side of said median plane will be equal to the lateral extent of said edge to the left, or outer, side of said plane, increased by the dimension by which said edge lies beyond the outer end of the depth gauge 23. Referring more particularly to Fig. 5, it will be seen that the extent of the shank 27 beyond the outer end of the depth gauge 23 is indicated by the character "X." If the dimension from the median plane of the link body to the laterally outermost point on the shank 29 is represented by the letter "Y," then the dimension from said median plane to the free tip of the tooth toe 28 should be "X plus Y."

It has heretofore been proposed to construct teeth of the general character of those here under consideration, for use in similar chains, with toes having equal lateral extents on opposite sides of the median plane of the link body for the purpose of balancing twisting stresses which are impressed upon the teeth during saw operation. Such a proposal, however, takes no account of the drag resulting from the cutting action of that portion of the sharpened edge of the tooth shank which projects beyond the cut-depth-controlling depth gauge 23. As a consequence, teeth constructed in accordance with such prior proposal have a tendency to twist toward the outer boundaries of the kerf, gouging into the kerf side walls and causing the chain to run erratically, thereby unduly broadening or widening the kerf. According to the present invention, however, the tooth toe will project toward the center of the kerf, beyond the median plane of the link body, to an extent sufficiently greater than its outward projection, to compensate for the drag of the working portion of the shank edge 29, thereby accurately balancing the strains encountered by the tooth on the opposite sides of such median plane, and overcoming the tendency of the tooth to wander from truly rectilinear travel.

I claim as my invention:

1. A saw chain cutter link comprising a planar body, a router tooth and a depth gauge projecting from said body generally in a common direction, said tooth comprising a shank deflected laterally in one direction from the plane of said body and a toe carried at the outer end of said shank, angularly related to said shank and traversing said plane to project laterally in the opposite direction beyond said plane, said toe and said shank being sharpened at their leading ends, the extent of said depth gauge being less than the extent of said shank, and the degree of projection of said toe beyond said plane being equal to the degree of deflection of said shank from said plane increased by the difference between the extent of said shank and the extent of said depth gauge.

2. A saw chain cutter link comprising a planar body formed, adjacent its front and rear ends, for pivotal connection, about parallel axes, with other links in a chain, a depth gauge and a router tooth projecting from said body, generally in a common direction perpendicular to a plane common to said axes, said tooth including a shank laterally deflected from the plane of said body and a toe carried at the outer end of said shank and projecting therefrom laterally in the opposite direction to traverse the plane of said body, the leading edges of said shank and said toe intersecting and being sharpened, and the lateral extent of the sharpened edge of said toe in said opposite direction beyond said body plane exceeding the lateral extent of the sharpened edge of said toe in the first-mentioned direction from said body plane by an amount equal to the difference between the extent of said shank and the extent of said depth gauge from said plane common to said axes.

3. A saw chain link comprising a generally planar plate having a depth gauge and a cutting tooth formed thereon, said tooth including a portion extending from said plate generally in the direction of projection of said depth gauge but offset laterally from the plane of said plate, and a portion extending laterally in the opposite direction beyond the plane of said plate, the leading edge of said tooth being bevelled to a chisel edge, said first-named portion projecting beyond the free end of said depth gauge, and said last-named tooth portion having a lateral extent beyond said plane substantially equal to the maximum offset of said first-named tooth portion, increased by the difference between the projection of said first-named tooth portion and the projection of said depth gauge.

4. In a saw chain, a link having a generally planar body and formed to provide a tooth having a portion deflected laterally from the plane of said body and a portion extending laterally oppositely from the outer end of said first-mentioned portion and traversing said plane, and means limiting the depth of cut of said last-named portion, the degree of projection of said last-mentioned portion beyond said plane being substantially equal to the maximum deflection of said first-mentioned portion increased by said depth of cut.

5. A saw chain cutter link including a body formed to provide a depth gauge and an L-shaped tooth comprising a planar shank inclined to one side of the plane of said body, and a planar toe carried at the outer end of said shank and substantially perpendicularly traversing the plane of said body, said toe lying beyond the outer end of said depth gauge, the forward edge of said toe, and the forward edge of said shank beyond said depth gauge, being sharpened to a chisel edge, and the effective cutting portions of said chisel edge, one of which portions is defined by the forward edge of said toe and the forward edge of said shank beyond said depth gauge and disposed at one side of said plane and the other of which portions is defined by the forward edge of said toe disposed at the opposite side of said plane, being equal.

DEWEY E. GOMMEL.

References Cited in the file of this patent

UNITED STATES PATENTS

| Number | Name | Date |
|---|---|---|
| 2,326,854 | Hassler | Aug. 17, 1943 |
| 2,508,784 | Cox | May 23, 1950 |
| 2,515,550 | Ciba | July 18, 1950 |
| 2,558,678 | Garrett | June 26, 1951 |